US006360554B1

(12) United States Patent
Trachtenberg

(10) Patent No.: US 6,360,554 B1
(45) Date of Patent: Mar. 26, 2002

(54) SINGLE CAN AUTOMOTIVE AIR CONDITIONER REFILL AND TREATMENT

(75) Inventor: Saul Trachtenberg, Brooklyn, NY (US)

(73) Assignee: Interdynamics, Inc., Brooklyn, NY (US)

( * ) Notice: Subject to any disclaimer, the term of this patent is extended or adjusted under 35 U.S.C. 154(b) by 0 days.

(21) Appl. No.: 09/602,705

(22) Filed: Jun. 24, 2000

Related U.S. Application Data

(63) Continuation-in-part of application No. 09/181,682, filed on Oct. 28, 1998, now Pat. No. 6,089,032.

(51) Int. Cl.⁷ .............................................. F25B 45/00
(52) U.S. Cl. ................... 62/292; 62/77; 62/149
(58) Field of Search ...................... 62/149, 77, 292; 141/346, 382, 3; 252/68

(56) References Cited

U.S. PATENT DOCUMENTS

| | | | | |
|---|---|---|---|---|
| 3,976,110 A | * | 8/1976 | White | 141/346 |
| 4,745,772 A | * | 5/1988 | Ferris | 62/292 |
| 4,761,963 A | * | 8/1988 | Kiese | 62/77 |
| 4,805,417 A | * | 2/1989 | Weaver et al. | 62/292 |
| 4,958,501 A | * | 9/1990 | Nakano et al. | 62/125 |
| 5,750,046 A | * | 5/1998 | Wheeler | 252/68 |
| 5,826,636 A | * | 10/1998 | Trigiani | 141/382 |
| 6,155,058 A | * | 12/2000 | Kanno et al. | 62/45.1 |

OTHER PUBLICATIONS

1. Transcript of Preliminary Injunction Hearing, Mag. Judge Roanne L. Man, Jan. 22, 2001.
2. Report and Recommendation of Mag. Judge Roanne L. Mann, Mar. 16, 2001.
3. Letter to Mag. Judge Roanne L. Mann by Peter L. Berger, Mar. 22, 2001.
4. Letter to Mag. Judge Roanne L. Mann by Roger L. Fidler, Mar. 23, 2001.
5. Amendment to Report and Recommendation of Mag. Judge Roanne L. Mann, Mar. 29, 2001.
6. Plaintiff's Objections to Report and Recommendation and Amendment Thereof, Apr. 9, 2001.
7. Guidance on Retrofitting to R–134a, from www.epa.gov/ozone/title6/069/retrguid.html Jan 8, 1998.
8. Auto Air Conditioner Refrigerant 12 with Leak Detector and Lubricant, No. FRLS–15 (specimen and photos).
9. Auto Air Conditioner R–134a 2 oz. Oil Charge, No. EC–2 (specimen and photos).
Transcript of Motion Before Hon. David G. Trager, Jun. 29, 2001.
Transcript of Motion Before Hon. David G. Trager, Jun. 29, 2001.

* cited by examiner

Primary Examiner—William Doerrler
Assistant Examiner—Melvin Jones
(74) Attorney, Agent, or Firm—Levisohn, Lerner, Berger & Langsam

(57) ABSTRACT

A delivery system to refill and treat automobile air conditioning systems is provided. A sealed housing such as a can contains a combination of automobile air conditioner treatment and a refill component. The refill component includes refrigerant and oil, and the treatment component includes automobile air conditioner treatment chemicals, such as sealant or a booster treatment. The housing can permit a controlled amount of the refill and the treatment to directly charge and treat an auto air conditioning system. A hose connectable between the housing and the air conditioning system is also provided.

8 Claims, 1 Drawing Sheet

SINGLE CAN AUTOMOTIVE AIR CONDITIONER REFILL AND TREATMENT

This application is a continuation-in-part of the inventor's prior application Ser. No. 09/181,682 filed Oct. 28, 1998 U.S. Pat. No. 6,089,032 entitled METHOD OF RETROFITTING AIR CONDITIONER AND SYSTEM THEREFOR which is soon to be printed as a patent.

After market servicing of air conditioners, especially by home enthusiasts is an ever-increasing and important American market. Many of these users are relatively unsophisticated and avoid undertaking simple tasks because of the complications of combining too many independent separate steps themselves.

One area addressed by my prior patent application which is about to issue is the use of a single can for retrofitting automobile air conditioners which combines both refrigerant and oil. The beneficial uses of a single can approach in terms of simplicity for the user, accuracy in the insertion of the correct proportions during the time of recharging and overall simplicity and error-proof design has led to commercial success of applicant's prior invention.

Another area which lends itself to single can refill approaches for automobile air conditioners is for an all in one refill and treatment where chemicals are added to treat the air conditioning system as a performance booster as well as sealant being included to seal the system. The treatment chemicals employed by applicant's assignee is sold as Maxi-Cool, and is a chemical which is a performance booster and treats various parts of the automobile air conditioning system enhancing its performance and extending its life.

Heretofore, each of the above individual components including the booster used by the after market purchaser was supplied in separate cans each having its own connection to the automobile air conditioning system intake service port. The consumer generally purchases a separate refrigerant, separate oil and a separate performance booster and would have to gauge how much to add of each to appropriately treat the automobile air conditioning system while recharging and refilling the same concurrently. Additionally, a consumer might fully recharge the automobile air conditioning system and later choose to add booster treatment chemicals but the proportions might be inaccurate. Every time a consumer connects and disconnects a hose to the service port of the air conditioning system, he/she runs the risk of bleeding out refrigerant and oil. Therefore, with the multiple can approach generally employed in the prior art, after market users who could benefit from the economics of doing simple repairs themselves avoid such simple repairs when there are a multiplicity of processes required, each requiring connecting and removing another hose to and from the air conditioning system.

An object of this invention is to extend the single can refill approach for automobile air conditioners to further enhance the utilization of economic benefit of reduction of packaging for an otherwise overall enhanced efficiency of a single can all in one approach in which preset amounts of refrigerant, oil and booster treatment are included to be concurrently inserted into the automobile air conditioning system. Additionally, sealant may or may not be included.

Another object of this invention is to materially reduce packaging required so that rather than have three sets of packages for three separate additives for an automotive air conditioner, the consumer can simply buy one package. Industry and society benefits by materially reducing the packaging required to achieve the function of refill and treatment of an automotive air conditioner in the aftermarket.

Other objects, advantages and features of this invention will become more apparent from the following description.

DETAILED DESCRIPTION OF THE PREFERRED EMBODIMENTS

Figure 1:
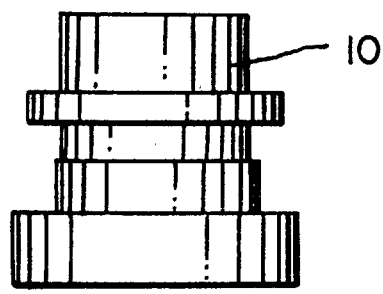
FIG. 1 is a front view diagram of the service port adapter of the invention.
Figure 2:
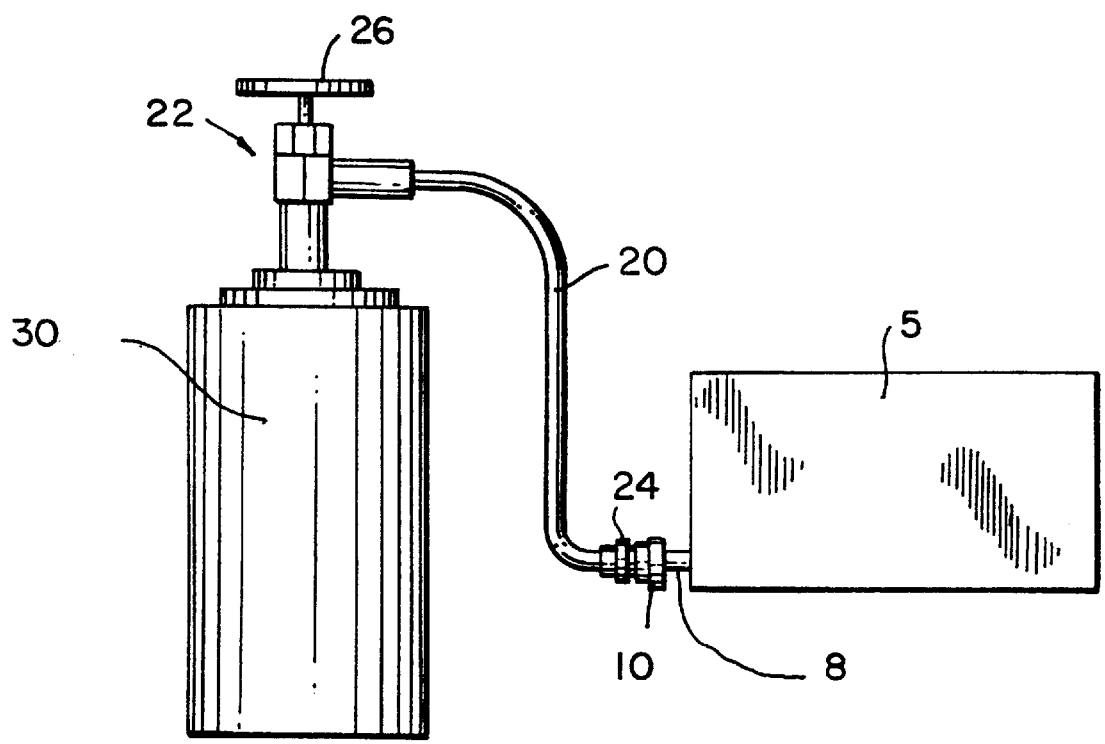
FIG. 2 is a front view diagram of a kit according to the invention.

Description herein follows with reference to FIGS. 1–2. Numeral 5 represents the automobile air conditioner (in block form) that is to be refilled and treated. Air conditioner 5 possesses a service port 8 for receiving refrigerant, lubricant, a booster treatment known as Maxi-Cool and sealant.

The low side AC service port is generally found on the larger diameter line that becomes cool between the compressor and the evaporator.

Service port adapter 10 is attached to air conditioner 5 via service port 8. This enables connecting hose 20 to communicate with air conditioner 5. Hose 20 includes, at one end, puncture valve 22 and connector 24 at the other end. Puncture valve 22 attaches to all in one treatment and refill can 30. Connector 24 attaches hose 20 to service port adapter 10. When the can 30 is secured to valve 22 (after connector 24 is attached to adapter 10), handle 26 is turned. The turning of handle 26 forces a pin (not shown) to puncture the seal (not shown) of the can, and the pressurized contents of the can are forced through valve 24, along hose 20, through adapter 10, and into air conditioner 5.

In operation, the invention is used as follows. Service port adapter 10 is securely attached to port 8 of air conditioner 5. Connector 24 of hose 20 is then secured to adapter 10. Can 30 is a sealed container and is attached to valve 22. Handle 26 is turned, the seal of can 30 is broken, and the lubricant therein is forced under pressure into the air conditioner 5. Valve 22 is closed, and can 30 is removed.

This single can approach eliminates the repeated and now unnecessary steps of continuing to couple and uncouple connector hoses to the service AC port of the air conditioner which both allows bleeding of the refrigerant and oil from the air conditioner, creates a generally messy situation all of which tends to detract from consumers wanting to be able to treat their own air conditioning systems with a relatively simple and foolproof system as provided by this invention.

Having described the invention with regard to specific embodiments, it is to be understood that the description is not meant as a limitation excluding further variations or modifications as may be apparent or may suggest themselves to those skilled in the art. It is intended that the present invention cover such variations and modifications as fall within the scope of the appended claims.

What is claimed is:

1. A delivery system to refill and treat automobile air conditioning systems, comprising:

a sealed housing, said sealed housing comprising the combination of automobile air conditioner treatment and refill, said refill comprising refrigerant and oil and said treatment comprising automobile air conditioner treatment chemicals, said sealed housing capable of controlled rupturing to permit a controlled amount of said refill and said treatment to directly charge and treat said auto air conditioning system, and a hose connectable between said housing and said air conditioning system.

2. A delivery system to refill and treat automobile air conditioning systems as claimed in claim 1, wherein said sealed housing comprises a can.

3. A unitary delivery system to refill and treat automobile air conditioning systems as claimed in claim 1, wherein said controlled rupturing of said sealed housing comprises a piercing needle.

4. A unitary delivery system to refill and treat automobile air conditioning systems as claimed in claim 2, wherein said controlled rupturing of said sealed can comprises a piercing needle.

5. A unitary delivery system to refill and treat automobile air conditioning systems as claimed in claim 3, wherein said treatment chemical comprises Maxi-Cool.

6. A unitary delivery system to refill and treat automobile air conditioning systems as claimed in claim 4, wherein said treatment chemical comprises Maxi-Cool.

7. A unitary delivery system to refill and treat automobile air conditioning systems as claimed in claim 1, wherein said sealed housing also comprises automobile air conditioner sealant.

8. A unitary delivery system to refill and treat automobile air conditioning systems as claimed in claim 5, wherein said controlled rupturing of said sealed housing comprises a piercing needle.

* * * * *